US008878922B2

(12) United States Patent
Anabuki

(10) Patent No.: US 8,878,922 B2
(45) Date of Patent: Nov. 4, 2014

(54) VIDEO IMAGE INFORMATION PROCESSING APPARATUS AND VIDEO IMAGE INFORMATION PROCESSING METHOD

(75) Inventor: Mahoro Anabuki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 279 days.

(21) Appl. No.: 13/249,942

(22) Filed: Sep. 30, 2011

(65) Prior Publication Data

US 2012/0086793 A1 Apr. 12, 2012

(30) Foreign Application Priority Data

Oct. 12, 2010 (JP) ................................. 2010-230101

(51) Int. Cl.
*A61B 5/103* (2006.01)
*H04N 7/14* (2006.01)
(52) U.S. Cl.
CPC ..................................... *H04N 7/144* (2013.01)
USPC ........................................... 348/77; 600/595
(58) Field of Classification Search
USPC ........................................... 600/587; 347/77
See application file for complete search history.

(56) References Cited

U.S. PATENT DOCUMENTS

| 5,491,510 | A | * | 2/1996 | Gove | ............................... | 348/77 |
| 5,951,571 | A | * | 9/1999 | Audette | ........................ | 606/130 |
| 6,514,219 | B1 | * | 2/2003 | Guimond et al. | ............. | 600/595 |
| 7,955,279 | B2 | | 6/2011 | Berthonnaud et al. | ........ | 600/595 |
| 2005/0182341 | A1 | * | 8/2005 | Katayama et al. | ............ | 600/587 |
| 2009/0259407 | A1 | * | 10/2009 | Gerlitz | ............................ | 702/19 |

FOREIGN PATENT DOCUMENTS

| JP | 2005-224452 | 8/2005 |
| JP | 3721330 | 11/2005 |

OTHER PUBLICATIONS

Grabner, Helmut and Gischof, Horst, "On-Line Boosting and Vision", Jun. 2006, Horst, 2006 Conference Proceedings of the IEEE Computer Society Conference on Computer Vision and Pattern Recognition, vol. 1, p. 260-267.*
K. Deguchi, "Basis of Robotic Vision", Corona Publishing Co., Ltd, 2000.
Grabner et al., "Real-time Tracking via On-line Boosting", In *Proceedings British Machine Vision Conference* (BMVC), vol. 1, pp. 47-56 (2006).

* cited by examiner

*Primary Examiner* — Sath V Perungavoor
*Assistant Examiner* — Janese Duley
(74) *Attorney, Agent, or Firm* — Fitzpatrick, Cella, Harper & Scinto

(57) ABSTRACT

A video image information processing apparatus includes a half mirror, an imaging unit arranged behind the half mirror for imaging a subject present in front of the half mirror, and a display unit that displays a video image in the half mirror. The video image information processing apparatus extracts a predetermined part of a human body from a video image of the subject captured by the imaging unit and performs measurement on the subject using information other than the video image. The video image information processing apparatus acquires evaluation information based on a result of the measurement performed by using information other than the video image and the position of the predetermined part of a human body. The video image information processing apparatus controls display by a display unit such that the acquired evaluation information is associated with the predetermined part in a mirror image in the half mirror.

8 Claims, 10 Drawing Sheets

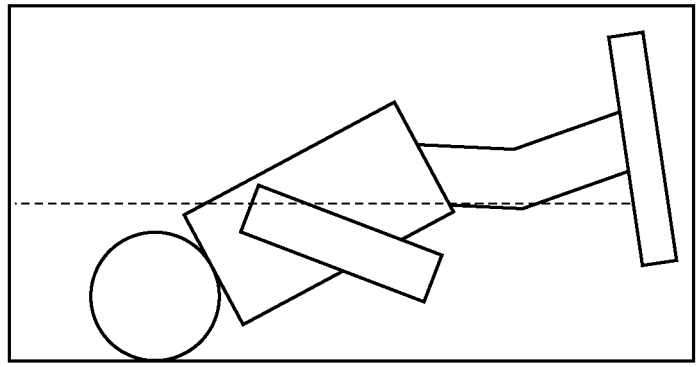
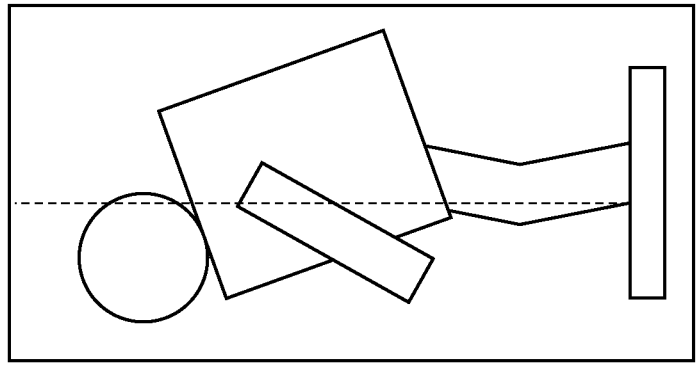
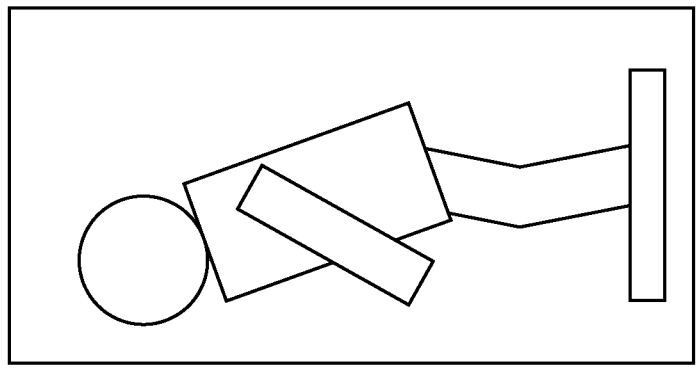

VIDEO IMAGE INFORMATION PROCESSING APPARATUS AND VIDEO IMAGE INFORMATION PROCESSING METHOD

BACKGROUND OF THE INVENTION

1. Field of the Invention

The present invention relates to an apparatus and a method for visualizing the relationship between the posture or the shape of the human body and evaluation indexes thereof, and a method for improving the posture.

2. Description of the Related Art

Utilizing the posture of the human body at the time of rehabilitation aimed at functional recovery or physical exercises for health maintenance in order to evaluate the rehabilitation or the physical exercises has been attracting greater attention. As an index for evaluating the posture, the center-of-gravity line (the line extending upward in the vertical direction from the center of gravity), which can be obtained by measurement of the human body, the positional relationship between the center-of-gravity line and the respective parts of the human body such as the knees or the waist (hereinafter referred to as a "human body part"), or the like is used.

For example, whether a person is standing in a stable posture can be evaluated according to the unstableness of the center-of-gravity line. Whether a person is able to walk in a safe posture can be determined according to whether the center-of-gravity line is on the foot on the rear side. Also, if the center-of-gravity line is in front of the rear-side foot, the human body will fall if the front-side foot slips. The distortion in posture can be evaluated according to the amount of deviation of the central position of a human body part such as the knees or the waist from the center-of-gravity line. However, it is difficult for the person who is performing rehabilitation or physical exercises to understand and realize such indexes during rehabilitation or physical exercise.

Therefore, in order to enable the person to understand the indexes for himself or herself, a technique is known in which an index that evaluates the posture of a person based on the human body measurement results is displayed superposed on the video image of the person captured by a camera. For example, Japanese Patent No. 3721330 (hereinafter referred to as "Document 1") discloses attaching a means for detecting the position of the center of gravity of a patient to a supporting means for supporting the patient when an x-ray image is captured. Document 1 discloses a technique in which the center-of-gravity line obtained based on the detected position of the center of gravity is displayed superposed on the x-ray image. With this technique, since the relationship between the center-of-gravity line and the posture shown in the x-ray skeleton image is expressed visually, it is easy to understand the relationship.

Also, Japanese Patent Laid-Open No. 2005-224452 (hereinafter referred to as "Document 2") discloses a technique for making a diagnosis on the posture using the center-of-gravity line and the video image of a person captured by a camera. With this technique, the diagnosis is made on the posture based on the relationship between the center-of-gravity line calculated based on foot pressure meter values, and the coordinates of the posture diagnosis point of the person in the video image. By this method, although it is difficult for a person to understand the index and evaluate his or her posture for himself or herself, it is possible to obtain an evaluation of the posture based on the index.

However, in a technique such as that disclosed in Document 1, the posture and the evaluation index thereof are simultaneously expressed on an x-ray skeleton image. Accordingly, it is difficult for people who are not doctors or physical therapists to correctly interpret the relationship between the displayed posture and the evaluation index thereof. Also, for lay people, although an ultimate evaluation result of the posture can be obtained with a technique such as that disclosed in Document 2, it is difficult to understand the evaluation result. Consequently, lay people cannot know how to improve their postures without hearing an explanation about the evaluation result.

SUMMARY OF THE INVENTION

According to an embodiment of the present invention, there are provided an apparatus and a method for presenting to a subject evaluation values corresponding to various evaluation indexes of a subject, such as the posture, body shape or condition inside the body of the subject, and information for improving the evaluation values in an easy-to-understand manner.

According to one aspect of the present invention, there is provided a video image information processing apparatus comprising: a half mirror; an imaging unit configured to be arranged behind the half mirror and image a subject present in front of the half mirror; an extraction unit configured to extract a predetermined part of a human body from a video image of the subject captured by the imaging unit; a measurement unit configured to perform measurement on the subject using information other than the video image; an evaluation unit configured to acquire evaluation information based on a result of the measurement performed by the measurement unit and the position of the predetermined part; and a display unit configured to display the evaluation information acquired by the evaluation unit in association with the predetermined part in a mirror image in the half mirror.

Further features of the present invention are apparent from the following description of exemplary embodiments with reference to the attached drawings.

BRIEF DESCRIPTION OF THE DRAWINGS

FIGS. 5A to 5C are diagrams illustrating an example of a video image captured by the video image capturing unit and video images obtained by altering the video image.

DESCRIPTION OF THE EMBODIMENTS

The present invention enables visualization of an appropriate method for improving the posture derived from posture evaluation indexes that are numerically expressed based on human body measurement results. For example, a difference between the current posture and an ideal posture, a posture to be taken for improving the posture, or a future posture obtained based on the posture change history is derived from the numerical posture evaluation indexes, and visualized. As an example of the method of visualization, the video image obtained by capturing a posture may be intentionally deformed greatly using texts, auxiliary lines and the like, thereby visualizing the method in a readily understandable manner. Also, the user can move his or her body by intuition by seeing an ideal posture or the posture to be taken by seeing the visualized information derived from the posture evaluation indexes, or realize the result caused by the current posture in the future by seeing his or her future posture. Some embodiments of the present invention will be described below.

In a video image information processing apparatus according to a first embodiment, the balance of a person on a balance measurement unit that is disposed in front of a half mirror (semi-transparent mirror face) is measured, and the image of the person (subject) is captured by a camera through the half mirror. Then, the evaluation index relating to the posture of the person on the balance measurement unit is calculated based on the result of the measurement performed by the balance measurement unit and the video image captured by the camera. The information derived from the index is presented in an information presentation unit configured to be a single body with the half mirror. The person on the balance measurement unit can see, through the half mirror, a mirror image of himself or herself and the information derived from the posture evaluation index visualized in the information presentation unit at the same time.

Figure 1:
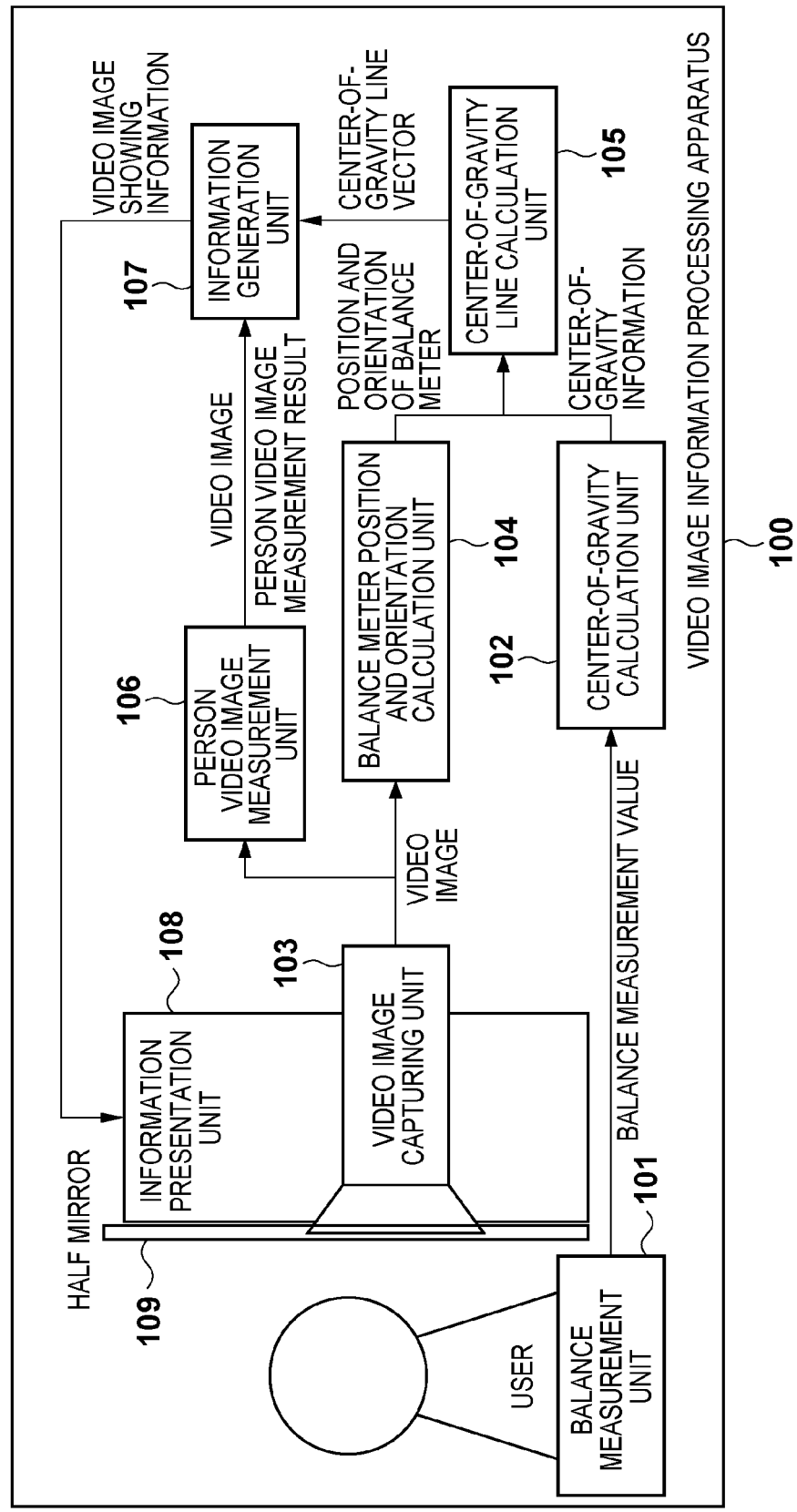
FIG. 1 is a diagram illustrating a configuration of a video image information processing apparatus according to a first embodiment of the present invention.

FIG. 1 is a schematic diagram of a video image information processing apparatus 100 of the present embodiment. The video image information processing apparatus 100 includes a balance measurement unit 101, a center-of-gravity calculation unit 102, a video image capturing unit 103, a balance meter position and orientation calculation unit 104, a center-of-gravity line calculation unit 105, a person video image measurement unit 106, an information generation unit 107, an information presentation unit 108 and a half mirror 109.

The balance measurement unit 101 is a generally-known balance meter. That is, the balance measurement unit 101 has three or more legs, and can measure loads applied to the respective legs. Measured load values of the respective legs are sent to the center-of-gravity calculation unit 102. This sending may be performed by wire communication or wireless communication. The balance measurement unit 101 is disposed in front of the half mirror 109, and performs measurement when a person steps on it.

The center-of-gravity calculation unit 102 calculates the position of the center of gravity of the loads applied to the balance measurement unit 101, based on a plurality of load values sent from the balance measurement unit 101. Specifically, the position that is calculated as the position of the center of gravity is the position where the ratio of the distances to the legs of the balance measurement unit 101 is a ratio of the reciprocals of the loads applied to the legs. The calculation result of the position of the center of gravity (coordinates of the position of the center of gravity) is sent to the center-of-gravity line calculation unit 105.

The video image capturing unit 103 is arranged behind the half mirror 109, and images a real space in front of the half mirror 109 through the half mirror 109. Since the balance measurement unit 101 is disposed in front of the half mirror 109, consequently, the video image capturing unit 103 images the balance measurement unit 101 and the person thereon. The captured video image is sent to the balance meter position and orientation calculation unit 104 and the person video image measurement unit 106.

The balance meter position and orientation calculation unit 104 calculates the position and orientation of the balance measurement unit 101 relative to the video image capturing unit 103, based on the video image received from the video image capturing unit 103. The position and orientation of a three-dimensional object relative to a camera is calculated by a method that is generally well known such as that disclosed by Koichiro Deguchi, *Basis of Robotic Vision*, Corona Publishing Co., Ltd., 2000 (hereinafter referred to as "Document 3"). For example, a rectangular marker whose shape is known is attached to the balance measurement unit 101. Then, the position and orientation of the rectangular marker as viewed from the video image capturing unit 103 is calculated based on the way the rectangular marker looks in the video image captured by the video image capturing unit 103.

Next, the position and orientation of the balance measurement unit 101 as viewed from the video image capturing unit 103 is calculated based on the relationship between the rectangular marker calibrated in advance and the position and orientation of the balance measurement unit 101. As another method, there is a method in which the position and orientation of the rectangular marker as viewed from the video image capturing unit 103 is calculated based on the way natural features such as edges or patterns that are unique to the balance measurement unit 101 look in the video image captured by the video image capturing unit 103. In any case, the balance meter position and orientation calculation unit 104 of the preset embodiment performs calculation of the position and orientation of a three-dimensional object relative to a camera, which is generally known well, and thus will not be further described.

The calculation result of the position and orientation of the balance measurement unit 101 relative to the video image capturing unit 103 is sent to the center-of-gravity line calculation unit 105. The center-of-gravity line calculation unit 105 calculates the position of the center of gravity of the loads applied to the balance measurement unit 101 in the video image captured by the video image capturing unit 103. For that calculation, the position of the center of gravity of the loads applied to the balance measurement unit 101 obtained from the center-of-gravity calculation unit 102, and the position and orientation of the balance measurement unit 101 relative to the video image capturing unit 103 obtained from the balance meter position and orientation calculation unit 104 are used. In this calculation method as well, a known method such as that disclosed in Document 3 can be used.

Next, a center-of-gravity line vector relative to the video image capturing unit 103, which extends upward in the vertical direction in the real space from the position of the center of gravity, is calculated. This vector may be obtained by storing a vector relative to the video image capturing unit 103 extending upward in the vertical direction in the real space in advance in the center-of-gravity line calculation unit 105, and setting the start point of the vector to the position of the center of gravity that has been obtained. Alternatively, this vector may be obtained in a method in which a gravity sensor, not shown in the drawings, is attached to the video image capturing unit 103, a vector extending upward in the vertical direction in the real space relative to the video image capturing unit 103 is obtained based on the measurement values of the sensor, and the start point of the vector is set to the position of the center of gravity that has been already obtained. The center-of-gravity line vector of the video image captured by the video image capturing unit 103 obtained in this manner is sent to the information generation unit 107.

The person video image measurement unit 106 measures a physical quantity of state of a person in the video image received in the video image capturing unit 103, using the video image. More specifically, the positions in the video image of human body parts such as the head, shoulders, elbows, hands, waist, knees and feet are measured or detected. In order to realize this, for example, a method disclosed by H. Grabner, M. Grabner, and H. Bischof, "Real-time Tracking via On-line Boosting", in *Proceedings of the British Machine Vision Conference* (BMVC), volume 1, pages 47-56, 2006 (hereinafter referred to as "Document 4") is used. That is, image features of human body parts such as the head or shoulders are learned in advance, and the image regions similar to the respective learning results are found in the video image received from the video image capturing unit 103. If such regions are found, those found image regions are also used for learning, and then human body parts search is performed in the video image received next. The positions of the human body parts in the video image received from the video image capturing unit 103, which are person video image measurement results, are sent to the information generation unit 107 together with the corresponding video image.

The information generation unit 107 generates information using the center-of-gravity line vector in the video image captured by the video image capturing unit 103 that is received from the center-of-gravity line calculation unit 105, and the person video image measurement results received from the person video image measurement unit 106. The relationship between the center-of-gravity line vector and the person video image measurement results (positions in the video image of human body parts) obtained here serves as a posture evaluation index in the present embodiment. The generated information indicates interpretation of the evaluation index or a method for improving the posture to an appropriate posture derived from the evaluation index. Specific examples of this information will be described later. Generated information is expressed as a video image by computer graphics (CG) or the like. In some cases, the information may be expressed exaggerated in some degree so as to allow a person (user) to realize the generated information more easily. Only the video image expressing the generated information may be sent out to the information presentation unit 108. Also, the video image expressing the generated information may be sent out to the information presentation unit 108, after being superposed on the video image captured by the video image capturing unit 103.

The information generated and expressed by the information generation unit 107 includes, for example, the length or the direction of a perpendicular line that extends from the position of a human body part in the video image captured by the video image capturing unit 103 toward the center-of-gravity line. The length of the perpendicular line indicates a difference (correction amount) from an ideal posture (posture in which the human body part serving as a key is closer to the center-of-gravity line than in the current posture), and the direction of the perpendicular line indicates the direction (correction direction) in which the posture should be corrected for improving the posture. In this case, the perpendicular line is expressed as a virtual line formed by computer graphics whose color or thickness is changed depending on the length, or whether the position of the human body part is on the right side or left side of the center-of-gravity line.

When this line is extended in the horizontal direction from the position of the corresponding human body part in the video image captured by the video image capturing unit 103, the amount of extension is expressed, in the video image captured by the video image capturing unit 103, as a deviation amount of the human body part from the center-of-gravity line. For example, when a human body part close to the center of the body such as the head or waist is distant from the central axis, the length of the perpendicular line is increased, and the perpendicular line is expressed in a notable manner as a thick red line or the like. In order to illustrate such a state, FIG. 2A illustrates a video image of a person standing sideways captured by the video image capturing unit 103. Also, FIG. 2B illustrates a video image obtained by converting the content of information generated by the information generation unit 107, and FIG. 2C illustrates an example of a video image in which both video images are superposed.

Figure 2C:
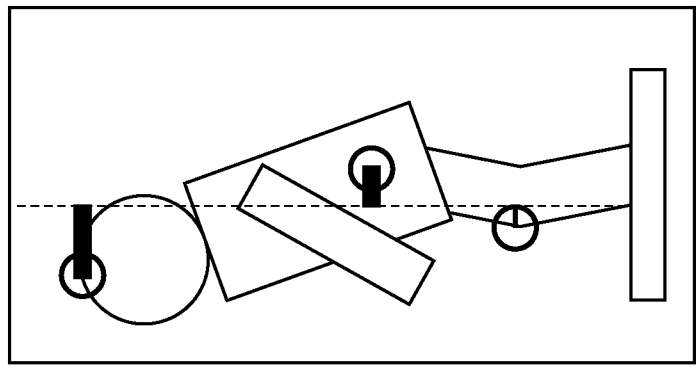
FIGS. 2A to 2C are diagrams respectively illustrating an example of a video image captured by a video image capturing unit, an example of a video image expressing information generated by an information generation unit, and an example of a video image in which both video images are superposed.
Figure 2B:
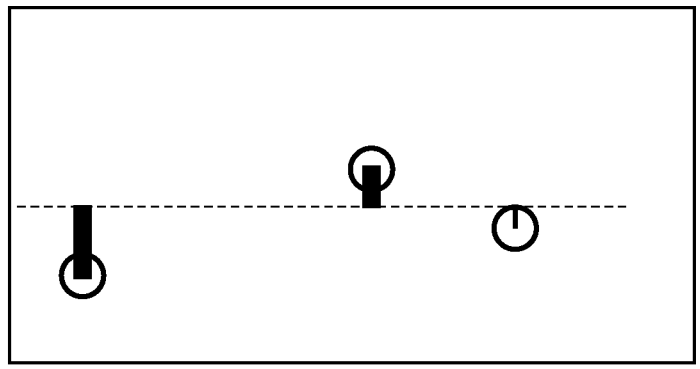
Figure 2A:
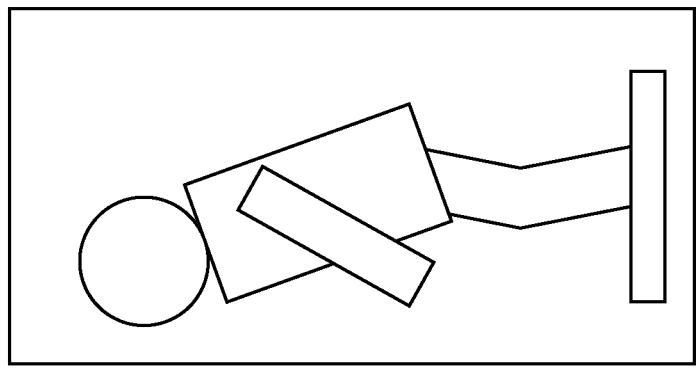

Dashed lines in FIGS. 2B and 2C each indicate the center-of-gravity line, and three circles represent the positions of the head, waist and knee, which are human body parts. In the case shown in FIGS. 2A to 2C, the person in the video image has a bad posture, and his or her head and waist are greatly deviated from the center-of-gravity line. Accordingly, thick lines are extended to the dashed line representing the center-of-gravity line from the circles depicted in the positions of the head and the waist, and the lengths of the lines indicate that the respective correction amounts are large. Also, the direction from a circle toward the center-of-gravity line indicates the correction direction. In this manner, with the present embodiment, since the correction amount and the correction direction are presented to the subject as graphics based on the evaluation information, the subject can grasp the part to be corrected and how to make the correction intuitively.

Figure 3C:
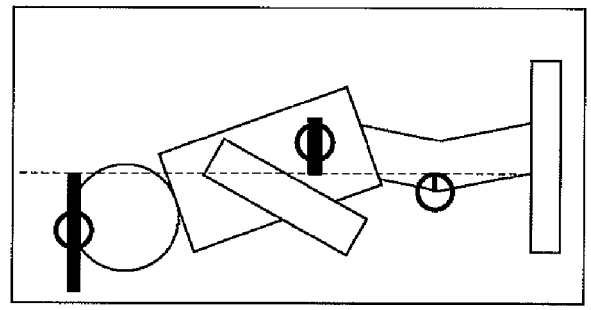
FIGS. 3A to 3C are diagrams respectively illustrating an example of a video image captured by the video image capturing unit, an example of a video image expressing information generated by the information generation unit, and an example of a video image in which both video images are superposed.
Figure 3B:
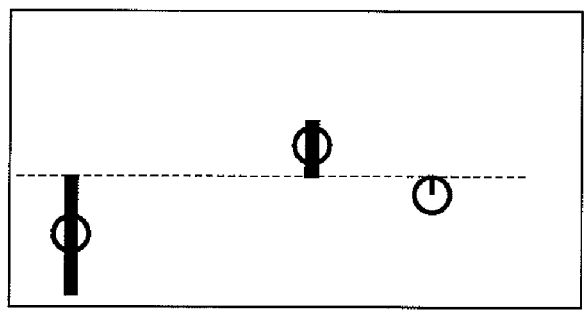
Figure 3A:
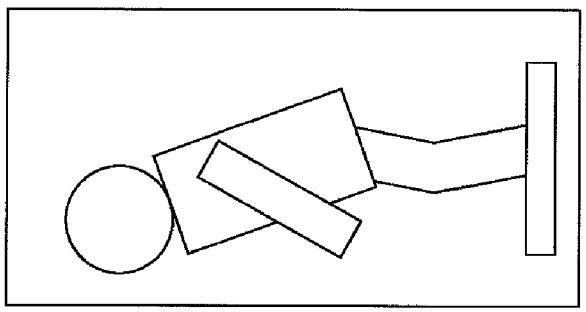

At this time, depending on the level of importance of the relation that a human body part has with respect to the center-of-gravity line, the length of the perpendicular line may be expressed in a way that exaggerates it. For example, in the case where the position of the waist, which should not deviate from the center-of-gravity line very much, does in fact deviate from the center-of-gravity line by a certain distance or more, the perpendicular line is displayed as having a length that is approximately double the length that it would have without exaggeration. FIG. 3A illustrates a video image captured by the video image capturing unit 103, and FIG. 3B shows an example of a video image obtained by exaggerating the perpendicular lines. By disposing the middle points of the perpendicular lines in the positions of the corresponding human body parts in the video image captured by the video image capturing unit 103, the exaggerated deviation amounts of the human body parts from the center-of-gravity line are expressed. FIG. 3C illustrates an example of a video image in which both video images are superposed.

Information indicating the positional relationship between the center-of-gravity line and the human body parts is not limited to the distance therebetween or arrangement thereof. For example, the frequency in which the lateral positional relationship between the center-of-gravity line and the human body part is inverted, or the moving speed of the human body part relative to the center-of-gravity line, which is obtained by successively processing video images, may serve as part of the information.

As described above, by expressing the center-of-gravity line received from the center-of-gravity line calculation unit 105 and the person video image measurement results received from the person video image measurement unit 106 according to a certain standard, interpretation of or a method for improving the posture of a person standing in front of the video image capturing unit 103 can be visualized. Note that information for interpreting the posture of a person or information indicating a method for improving the posture based on the information for interpreting the posture may be, of course, information other than the positional relationship between the center-of-gravity line and the human body parts. Also, the method for expressing information is not limited to CG video images. For example, a video image of a good posture captured in the past, that is, a video image captured when the positional relationship between the center-of-gravity line and the human body part was good may be saved, and when the positional relationship has deteriorated, a video image showing the deteriorated positional relationship may be displayed superposed on the saved video image showing the good positional relationship.

Figure 4A:
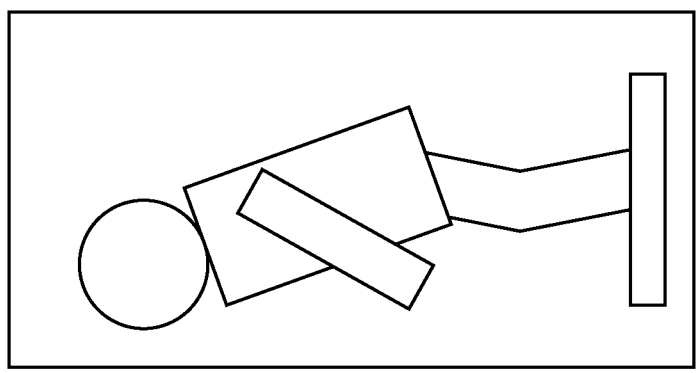
FIGS. 4A to 4C are diagrams respectively illustrating a video image captured by the video image capturing unit, a video image of good posture captured in the past, and a video image in which both video images are superposed.
Figure 4B:
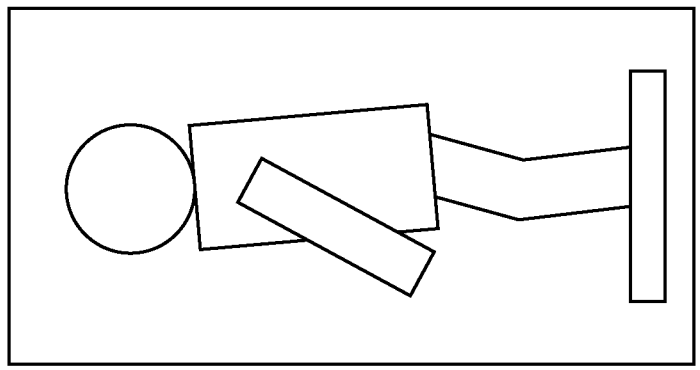
Figure 4C:
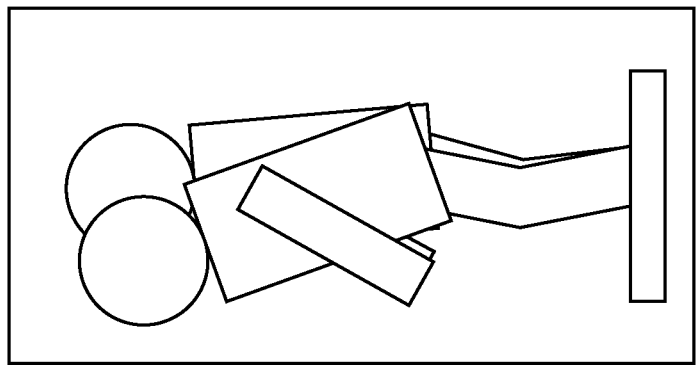

FIGS. 4A to 4C schematically illustrate an example of such an expression method. FIG. 4A illustrates a video image captured by the video image capturing unit 103, and FIG. 4B illustrates a video image of an ideal posture captured in the past. FIG. 4C is a video image in which FIGS. 4A and 4B are superposed. When the subject sees this image, it is possible to visually recognize the posture evaluated as a good posture. In contrast, a video image of the final state (e.g., falling) captured in the past when the positional relationship between the center-of-gravity line and the human body part was bad may be saved, and when the relationship between the center-of-gravity line and the human body part becomes similar to that state, the video image of the current state may be displayed superposed on the saved video image showing the bad positional relationship. When the subject sees the video images, he or she can visually recognize the risk in keeping the current posture.

Also, the length and direction of the perpendicular line that extends from the position of the human body part toward the center-of-gravity line may be expressed by altering the video image captured by the video image capturing unit 103 instead of expressing the length or direction as lines. For example, in the case where the waist, which is one of the human body parts, is deviated from the center-of-gravity line by a certain distance or more, the video image may be altered such that a video image in which the waist is extremely deviated from the center-of-gravity line is virtually generated, thereby expressing the length and the direction. FIG. 5B, described below, schematically illustrates such an example.

Also, in the case where the positional relationship between the center-of-gravity line and a human body part, namely, the deviation amount of the position of the human body part from the center-of-gravity line, is larger than a predetermined threshold, such a state may be expressed by a video image in which the deviation amount is exaggerated and the actual video image of the video image capturing unit 103 is extended laterally or tilted relative to the actual condition. FIG. 5A shows a video image captured by the video image capturing unit 103, and in FIG. 5B, the video image in FIG. 5A is altered such that the waist portion is extremely deviated from the center-of-gravity line, thereby exaggerating the separation from the center-of-gravity line. FIG. 5C schematically illustrates an example in which the video image in FIG. 5A is tilted. Note that in the present embodiment, a method known to those skilled in the art for realizing superposition of a CG video image and a captured video image, alteration of a video image or the like, can be used.

Part or the entirety of the information presentation unit 108 is configured to be a single body with the half mirror 109. The information presentation unit 108 displays a video image received from the information generation unit 107 so as to be superposed on the mirror image in the half mirror 109. For example, this is realized by attaching a liquid crystal display to the back of the half mirror. Also, this may be realized by attaching a transparent diffusion sheet on the half mirror, and projecting a video image by a projector. The video image received from the information generation unit 107 may be a video image in which only the information generated by the information generation unit 107 is expressed, or may be a video image in which that video image is superposed on the video image captured by the video image capturing unit 103. Since the information presentation unit 108 is configured to be a single body with the half mirror 109, it is arranged near the video image capturing unit 103 arranged behind the half mirror 109. With such a configuration, the subject can observe the mirror image in the half mirror 109 and the video image generated by the information generation unit 107 while superposing one image on the other. Note that based on the video image captured by the video image capturing unit 103, control is performed such that the mirror image in the half mirror 109 and the video image displayed by the information generation unit 107 have the same scale (such that the video image of the person has a real size).

In the case where the video image displayed in the information presentation unit 108 is only the information generated by the information generation unit 107, in the information presentation unit 108, a video image in which information generated by the information generation unit 107 is expressed is displayed so as to have an appropriate positional relationship with respect to the person in the mirror image in the half mirror 109. For example, in the case where the video image in which the content of information generated by the information generation unit 107 is converted into an image and expressed is a perpendicular line extending from a position of a human body part toward the center-of-gravity line, the video image from the information generation unit 107 is displayed in a position where that perpendicular line looks as if it extended from the human body part of the person in the mirror image. Specifically, the video image generated by the information generation unit 107 is horizontally flipped, and the size and position thereof are changed with reference to advance calibration information and the like, and thereafter, the video image is displayed in the information presentation unit 108.

In the case where in the video image displayed in the information presentation unit 108, the information generated by the information generation unit 107 is superposed on the video image captured by the video image capturing unit 103, the position or the size thereof may not be changed and may be displayed in the information presentation unit 108 without change. The position or the size may be changed taking interference by the person in the mirror image into consideration. Also, the video image may or may not be horizontally flipped.

The half mirror 109 may be formed by coating glass with silver or aluminum or by attaching a semi-transparent mirror face film to a transparent acrylic board, or transparent polycarbonate board, as long as it has an optical characteristics as a mirror face.

Figure 6:
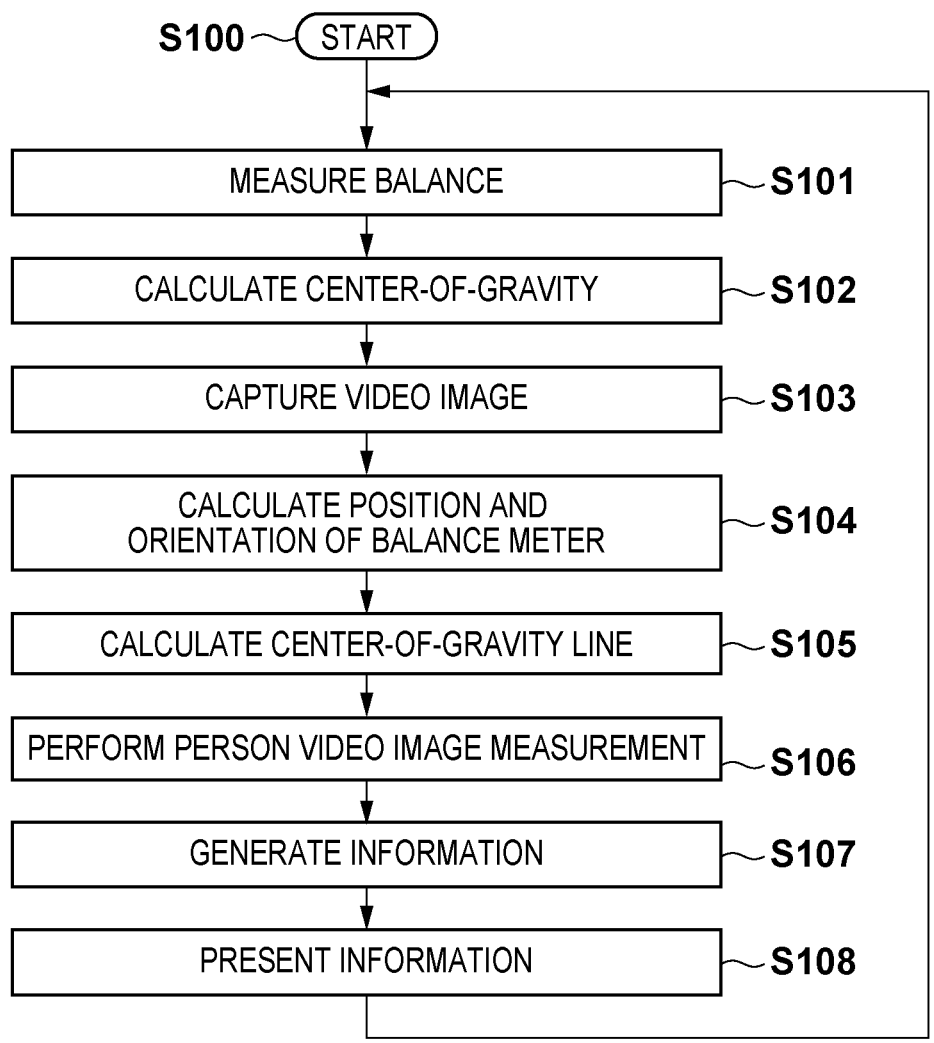
FIG. 6 illustrates processing performed by the video image information processing apparatus.

FIG. 6 illustrates a flow of processing performed by the video image information processing apparatus 100 of the present embodiment. Note that the program code according to this flowchart is stored in a memory such as a RAM or a ROM, not shown in the drawings, in the apparatus of the present embodiment, and the processing flow is read out by a CPU or the like, not shown in the drawings, and executed. Note that processing for sending and receiving data and the like may be performed directly or via a network, of course. Thus, such processing will not be particularly mentioned in the following description.

In step S100, processing performed in a state in which a user is on the balance measurement unit 101 is started. In step S101, the balance measurement unit 101 performs balance measurement. The balance measurement values (values of the loads applied to the respective legs of the balance measurement unit 101) that have been measured are sent to the center-of-gravity calculation unit 102. In step S102, the center-of-gravity calculation unit 102 calculates the position of the center of gravity (coordinates of the position of the center of gravity) of the loads applied to the balance measurement unit 101 based on the plurality of load values sent from the balance measurement unit 101. The calculated value is sent to the center-of-gravity line calculation unit 105.

In step S103, the video image capturing unit 103 captures a video image. In the captured video image, the balance measurement unit 101 and the user standing thereon are captured. The captured video image is sent to the balance meter position and orientation calculation unit 104 and the person video image measurement unit 106. In step S104, the balance meter position and orientation calculation unit 104 calculates the position and orientation of the balance measurement unit 101 relative to the video image capturing unit 103 based on the video image received from the video image capturing unit 103. The calculated position and orientation of the balance measurement unit 101 relative to the video image capturing unit 103 is sent to the center-of-gravity line calculation unit 105.

In step S105, the center-of-gravity line calculation unit 105 calculates the position of the center of gravity of the loads applied to the balance measurement unit 101 in the video image captured by the video image capturing unit 103. Next, a center-of-gravity line vector relative to the video image capturing unit 103 that extends from the position of the center of gravity upward in the vertical direction in the real space is calculated. The calculated center-of-gravity line vector is sent to the information generation unit 107, and thereafter, the processing proceeds to step S106.

In step S106, the person video image measurement unit 106 performs person video image measurement on the person in the video image sent from the video image capturing unit 103. More specifically, where the human body parts such as the head, shoulders, elbows, hands, waist, knees or feet are in the video image is measured or detected. That is, the positions of the human body parts in the video image received from the video image capturing unit 103 are measured. These person video image measurement results and the corresponding video image are sent to the information generation unit 107.

In step S107, the information generation unit 107 generates information derived from an evaluation index, based on the center-of-gravity line vector in the video image that has been captured by the video image capturing unit 103 and sent from the center-of-gravity line calculation unit 105, and the person video image measurement results sent from the person video image measurement unit 106. The generated information derived from an evaluation index is expressed as a video image, and only the video image, or a video image in which that video image is superposed on the video image captured by the video image capturing unit 103 is sent to the information presentation unit 108. In step S108, the information presentation unit 108 displays a video image including the information derived from the evaluation index sent from the information generation unit 107. Then, the processing returns to step S101.

With the processing described above, the video image information processing apparatus 100 can visualize information derived from an evaluation index of the posture of a user, that is, interpretation thereof or a method for improving the posture to an appropriate posture. In this manner, the user of the video image information processing apparatus 100 of the present embodiment can visually recognize a difference between the current posture and a posture in the past or an ideal posture, or a method for correcting the position of human body parts for increasing or decreasing such a difference. Since time required for the processing in steps S101 to S108 is a short period of time (e.g., 1/30 second), the user can see the interpretation of the evaluation index with respect to his or her posture captured 1/30 second before (perceived as the real-time posture), and a method for improving the posture to an appropriate posture. Then, by seeing the visualized information, the user can grasp the method for appropriately correcting the posture for himself or herself.

Note that in the present embodiment, although the video image information processing apparatus 100 visualizes the information derived from an evaluation index of the posture of a user as a video image, the information may be expressed using a modality other than those using video images. Specifically, the information presentation unit 108 may, instead of displaying video images, output sounds, or give a tactile stimulus, for example.

For example, in the information generation unit 107 of the present embodiment, when information that the posture corresponds to "round-shouldered posture" is generated based on the evaluation index, the sound "You have a round-shouldered posture" may be output from the information presentation unit 108. Alternatively, the information presentation unit 108 may give an impact to the back of the user by, for example, ejecting a small object to his or her back, thereby allowing the user to realize that he or she has a round-shouldered posture.

Next, a second embodiment will be described. A video image information processing apparatus according to the second embodiment includes, in addition to the video image information processing apparatus presented as the first embodiment, an information accumulation function and an information editing function. With this configuration, in addition to the information derived from an evaluation index, information edited by other users can be presented to the user.

Figure 7:
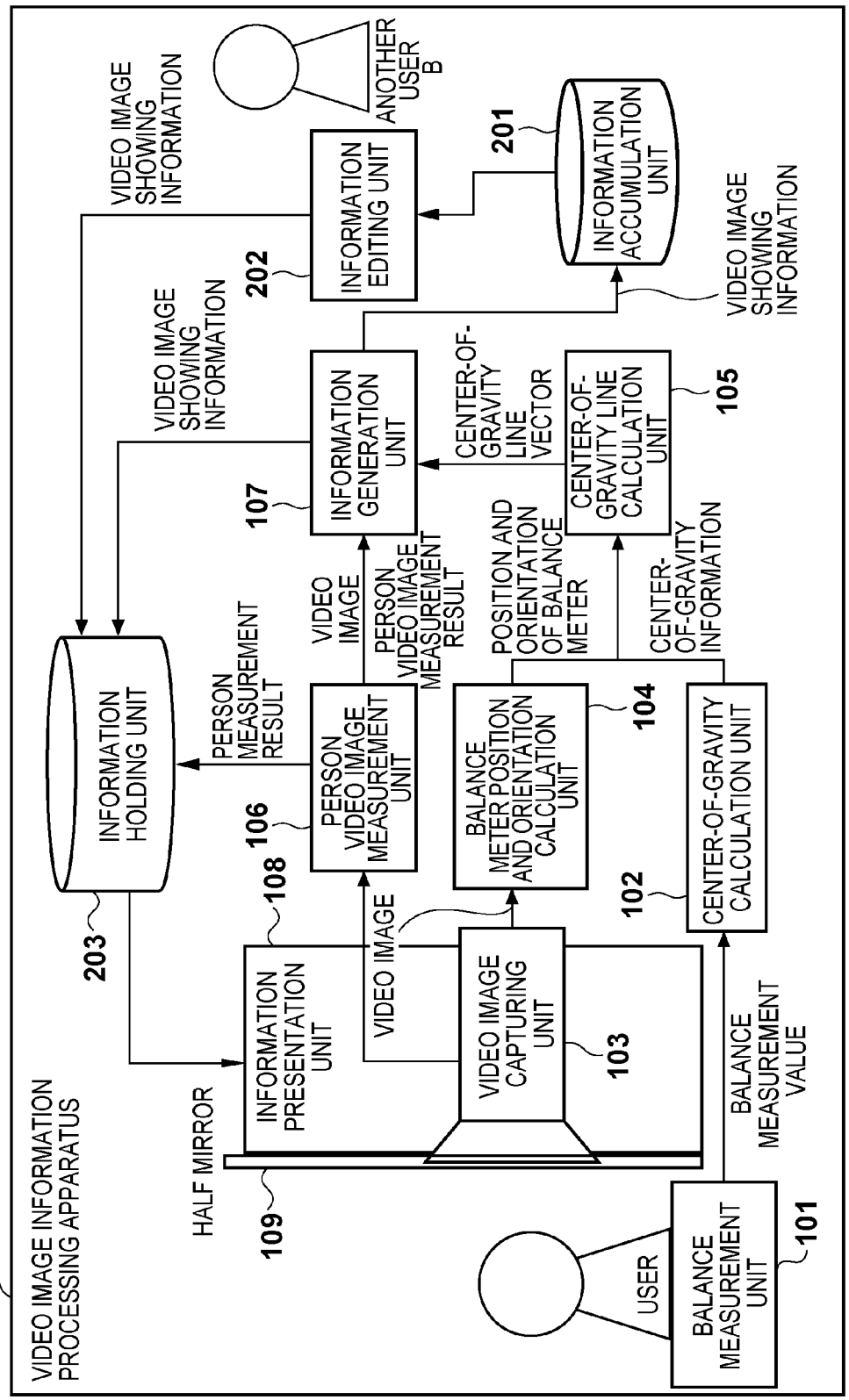
FIG. 7 shows a configuration of another video image information processing apparatus.

FIG. 7 shows a video image information processing apparatus 200 according to the present embodiment. As shown in FIG. 7, the video image information processing apparatus 200 includes, in addition to the video image information processing apparatus 100 according to the first embodiment shown in FIG. 1, an information accumulation unit 201, an information editing unit 202 and an information holding unit 203.

The balance measurement unit 101 performs general balance measurement. In the present embodiment, the balance measurement unit 101 is arranged in front of the half mirror 109, and is used in a state in which a person is standing thereon. The center-of-gravity calculation unit 102 calculates the position of the center of gravity of the loads applied to the balance measurement unit 101, based on a plurality of load values sent from the balance measurement unit 101. The calculated position of the center of gravity is sent to the center-of-gravity line calculation unit 105.

The video image capturing unit 103 is arranged behind the half mirror 109, and images the real space in front of the half mirror 109 through the half mirror 109. The captured video image is sent to the balance meter position and orientation calculation unit 104 and the person video image measurement unit 106. The balance meter position and orientation calculation unit 104 calculates the position and orientation of the balance measurement unit 101 relative to the video image capturing unit 103 based on the video image received from the video image capturing unit 103. The calculated position and orientation of the balance measurement unit 101 relative to video image capturing unit 103 is sent to the center-of-gravity line calculation unit 105.

The center-of-gravity line calculation unit 105 calculates the position of the center of gravity of the loads applied to the balance measurement unit 101 in the video image captured by the video image capturing unit 103. The calculated center-of-gravity line vector in the video image captured by the video image capturing unit 103 is sent to the information generation unit 107. The person video image measurement unit 106 measures the physical quantity of state of a person in the video image received from the video image capturing unit 103. More specifically, whether or not a person is in the video image is detected, and the positions in the video image of the human body parts such as the head, shoulders, elbows, hands, waist, knees or feet are measured. These person video image measurement results are sent to the information holding unit 203 and the information generation unit 107. The video image corresponding to the person video image measurement results is also sent to the information generation unit 107 together with the results.

The information generation unit 107 generates information derived from an evaluation index based on the center-of-gravity line vector in the video image captured by the video image capturing unit 103 received from the center-of-gravity line calculation unit 105, and the person video image measurement results received from the person video image measurement unit 106. The generated information is expressed as a video image by computer graphics or the like. The information generated by the information generation unit 107 is information for evaluating and interpreting the posture of a person standing in front of the video image capturing unit 103, or information indicating a method for improving the posture based on the information for interpreting the posture. This video image is superposed on the video image captured by the video image capturing unit 103 and thereafter sent to the information accumulation unit 201. Note that in the case where the information generation unit 107 has determined not to edit the generated information, for example, in the case where the information expresses only facts such as height or weight, the video image expressing the generated information is sent to the information holding unit 203. Note that in the case where the information generation unit 107 has determined to edit the generated information, the video image generated by the information generation unit 107 may be sent to the information holding unit 203 and the information accumulation unit 201. In this case, the subject can observe an unedited video image corresponding to the information generated by the information generation unit 107 in real time.

The information accumulation unit 201 is a storage unit for recording video images sent from the information generation unit 107. Images are recorded such that each video image can be accessed according to the capturing date and time, or the properties of the information superposed on the video image such as a result of detection as to whether a person is in the video image, for example. The recorded video image is sent to the information editing unit 202. This sending may be performed by the information accumulation unit 201 autonomously, or may be performed in response to a reference request from the information editing unit 202. For example, when a video image is sent from the information generation unit 107, the information accumulation unit 201 may immediately send the video image to the information editing unit 202, or it may wait for a reference request from the information editing unit 202, and send the video image to the information editing unit 202 automatically when a certain period of time has elapsed. Note that the information accumulation unit 201 may be physically separated from the information generation unit 107.

The information editing unit 202 serves as a browser that references the video images recorded in the information accumulation unit 201, and provides a user with an interface for editing information shown in the video image. The user herein referred to is a person (user B) different from the person (user A) on the balance measurement unit 101. For example, a case is considered in which the user B is a doctor who evaluates the posture of the user A. The user B issues a reference request for a video image recorded in the information accumulation unit 201 via the information editing unit 202. The user B edits (for example, performs addition, deletion or processing) information shown in the video image sent from the information accumulation unit 201, such that the user A can understand the information easily. Here, the editing of information refers to, for example, fine adjustment of the information shown in the video image, the center-of-gravity line vector, or the measurement positions of the human body parts (alteration of the length of the vector, the measurement positions of the parts, or the like). Also, editing of information refers to addition of comments or auxiliary lines to the video image, or change in the shape or the color or partial deletion of the video image. Such edit operations are performed using a generally-known GUI of a mouse or a keyboard, gestures, sounds or the like. When the user B has not edited information for a certain period of time, or when an operation for ending edit operation is performed after the user B has started editing information, the video image showing unedited information or edited information is sent to the information holding unit 203. Note that the information editing unit 202 may be physically separated from the information accumulation unit 201.

The information holding unit 203 is a storage unit for recording a video image showing the information sent from the information generation unit 107 or the information editing unit 202. Also, the information holding unit 203 sends the recorded video image to the information presentation unit 108 based on the person video image measurement results received from the person video image measurement unit 106. For example, when the following measurement results are received, the information holding unit 203 sends a video image recorded and held therein to the information presentation unit 108. That is, the information holding unit 203 sends the video image when it has received a measurement result indicating "a person is in the video image" or "a human body part in the video image has a specific positional relationship" from the person video image measurement unit 106. Accordingly, the information holding unit 203 sends a recorded video image to the information presentation unit 108 when the user A is in front of the video image capturing unit 103, or when the user A has made a specific gesture in front of the video image capturing unit 103. Note that the information holding unit 203 may be physically separated from the information editing unit 202 or the information presentation unit 108.

The information presentation unit 108 is formed as a single body with the half mirror 109. The information presentation unit 108 displays the video image received from the information holding unit 203 superposed on the mirror image in the half mirror 109. At this time, the video image may or may not be horizontally flipped.

Figure 8:
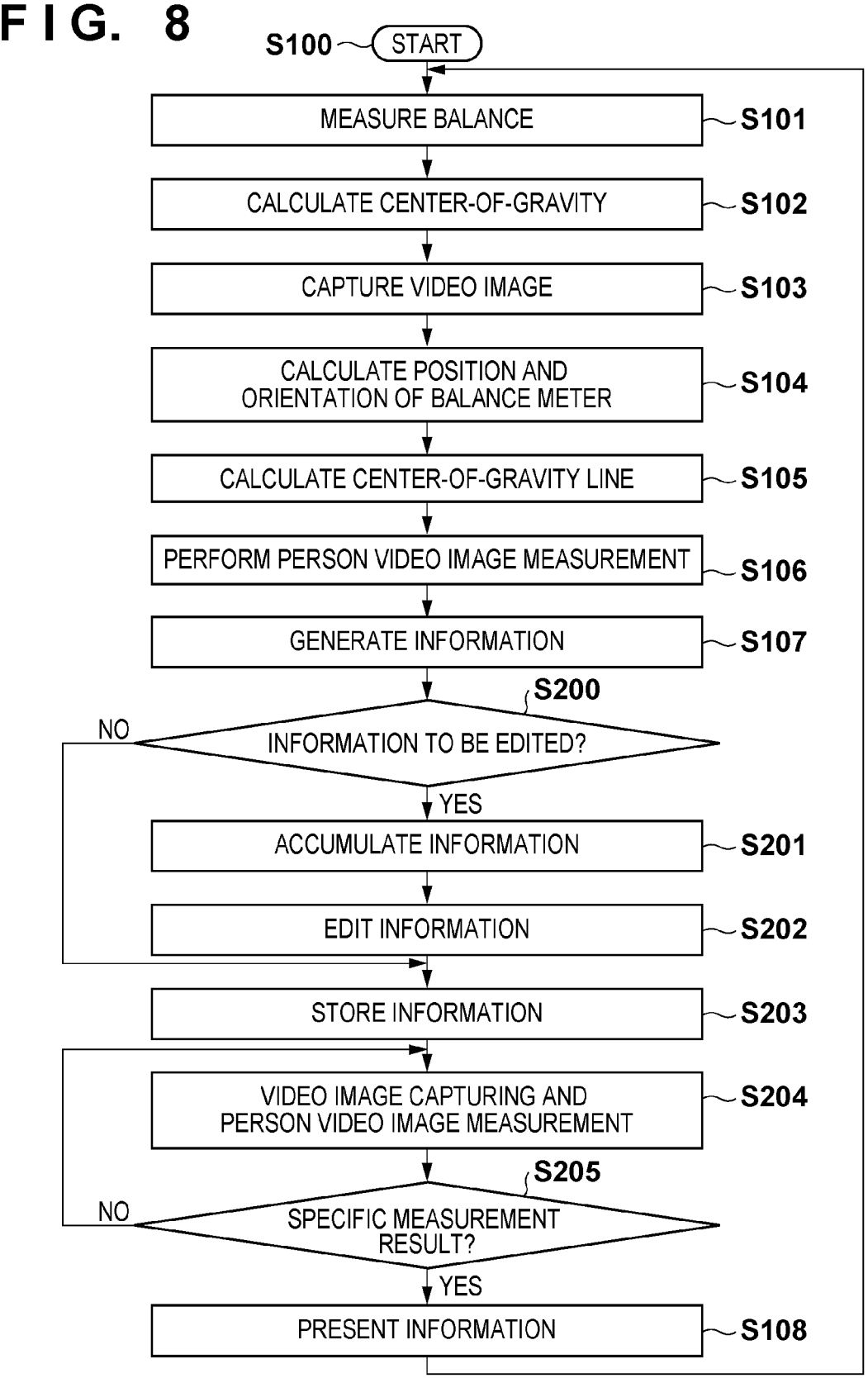
FIG. 8 illustrates processing performed by the video image information processing apparatus.

FIG. 8 illustrates a flow of processing performed by the video image information processing apparatus 200 of the present embodiment. As shown in FIG. 8, the processing performed by the video image information processing apparatus 200 is formed by adding several steps to the processing performed by the video image information processing apparatus 100 of the first embodiment in FIG. 6. Accordingly, the steps that are the same as those in the processing of the video image information processing apparatus 100 will not be described in details. Note that the program code according to this flowchart is stored in a memory such as a RAM or a ROM, not shown in the drawings, in the apparatus of the present embodiment, and the processing flow is read out by a CPU or the like, not shown in the drawings, and executed. Note that processing for sending and receiving data and the like may be performed directly or via a network, of course. Thus, such processing will not be particularly mentioned in the following description.

In step S100, a user steps on the balance measurement unit 101, and thereby the processing is started. Steps S101 to S105 are performed similarly to the processing performed by the video image information processing apparatus 100 of the first embodiment.

Also in step S106 subsequent to step S105, processing similar to that performed by the video image information processing apparatus 100 of the first embodiment is performed. Note that in the processing performed by the video image information processing apparatus 200, the person video image measurement unit 106 determines whether a person is in the video image sent from the video image capturing unit 103. This determination is performed at the same time as the determination of the positions in the video image of the human body parts, such as the head, shoulders, elbows, hands, waist, knees, and feet. The person video image measurement results are sent to the information holding unit 203 and the information generation unit 107.

In step S107, the information generation unit 107 generates information derived from an evaluation index, based on the center-of-gravity line vector in the video image that has been captured by the video image capturing unit 103 and sent from the center-of-gravity line calculation unit 105, and the person video image measurement results sent from the person video image measurement unit 106. The generated information is expressed as a video image.

In step S200, the information generation unit 107 determines whether the information generated in step S107 is to be edited. If the information generation unit 107 has determined that the information is to be edited, a video image in which the video image expressing the generated information is superposed on the video image captured by the video image capturing unit 103 is sent out to the information accumulation unit 201, and the processing proceeds to step S201. If the information generation unit 107 has determined that the information is not to be edited, a video image in which the video image expressing the generated information is superposed on the video image captured by the video image capturing unit 103 is sent out to the information holding unit 203, and the processing proceeds to step S203.

In step S201, the information accumulation unit 201 records the video image sent from the information generation unit 107. Thereafter, the processing proceeds to step S202.

In step S202, first, the video image recorded in the information accumulation unit 201 is sent out to the information editing unit 202. This sending of a video image is performed automatically when a certain period of time has elapsed after recording of that video image in the information accumulation unit 201, or in response to a reference request from the information editing unit 202. For this reason, the time interval between steps S201 and S202 is not constant, and may change depending on the case. Accordingly, step S202 may start in an extremely short period of time after step S201 has been ended, or start in several hours or several days after step S201 has been ended.

Thereafter, the information editing unit 202 accepts editing performed by the user B on the information shown in the video image sent from the information accumulation unit 201 to the information editing unit 202, namely, addition, deletion, processing and the like. Then, when the user B has ended editing the information and has performed an operation for ending edit operation with respect to the information editing unit 202, the video image showing the edited information is sent to the information holding unit 203, and the processing proceeds to step S203.

In step S203, the information holding unit 203 records and holds the video image sent from the person video image measurement unit 106 or the information editing unit 202. In step S204, the video image capturing unit 103 captures a video image. Thereafter, upon receiving the video image, the person video image measurement unit 106 determines whether a person is in the video image. The processing proceeds to step S205 when the person video image measurement result is sent to the information holding unit 203.

In step S205, the information holding unit 203 identifies whether the person video image measurement result received from the person video image measurement unit 106 corresponds to a specific measurement result. The specific measurement result refers to a measurement result indicating "a person is in the video image" or "a human body part in the video image has a specific positional relationship", for example. If the person video image measurement result corresponds to the specific measurement result, the video image recorded in the information holding unit 203 is sent to the information presentation unit 108, and thereafter, the processing proceeds to step S108. If the person video image measurement result does not correspond to the specific measurement result, the processing returns to step S204.

Note that in the case where the information holding unit 203 has a plurality of video images recorded therein, the video image to be sent is arbitrarily determined. For example, only the latest video image may be sent, or all video images may be sent in chronological order. Alternatively, a fixed number of most recent video images may be sent. In step S108, in the information presentation unit 108, the video image sent from the information holding unit 203 is displayed. Then, the processing returns to step S101.

With the processing described above, the video image information processing apparatus 200 visualizes interpretation of an evaluation index of the posture of the user or a method for improving the posture to an appropriate posture, which are derived from the evaluation index. Unlike the video image information processing apparatus 100 according to the first embodiment, processing in steps S101 to S108 is performed over several days, depending on the case. Instead, the user A can see the interpretation of the evaluation index for his or her own posture, or a method for improving the posture to an appropriate posture as information that has been manually edited by the user B. Then, by seeing that visualized information, the user can grasp the method for appropriately correcting his or her own posture for himself or herself.

Note that in the processing flowchart shown in FIG. 8, processing may be suspended in step S202, S204 or S205.

That is, unless the processing advances to step S108, it does not return to step S101. However, when a plurality of the same processing flows are executed while starting the flows at mutually different start times, even if one processing flow is suspended in step S202, steps S101 to S107 can be executed by other processing flows. Accordingly, it is possible to avoid a state in which although the user A is on the balance measurement unit 101, the processing by the video image information processing apparatus 200 cannot be performed.

Next, a third embodiment will be described. A video image information processing apparatus of the third embodiment images a person standing in front of the half mirror with a camera through the half mirror, and measures the body of the person in front of the half mirror using data other than that captured video image. Then, based on the captured video image and the body measurement result, the physiological quantity of state of the person standing in front of the half mirror is measured. Furthermore, the information relating to the human body derived from the measurement results is presented to the information presentation unit configured to be a single body with the half mirror. Finally, the user can see, through the half mirror, the mirror image of himself or herself and information visualized in the information presentation unit altogether.

Figure 9:
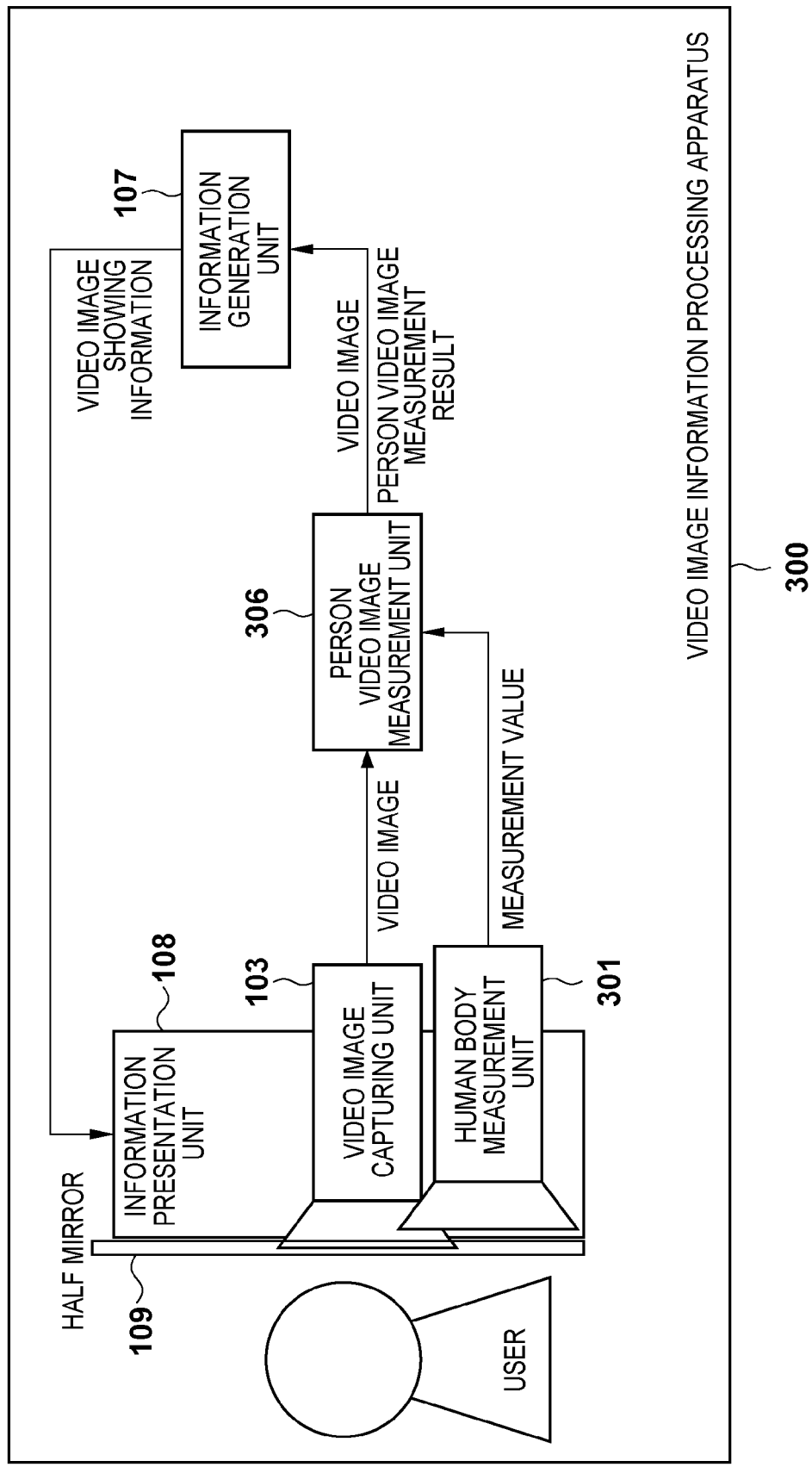
FIG. 9 shows a configuration of another video image information processing apparatus.

FIG. 9 is a schematic diagram of a video image information processing apparatus 300 according to the present embodiment. As shown in FIG. 9, the video image information processing apparatus 300 includes a human body measurement unit 301, a video image capturing unit 103, a human video image measurement unit 306, an information generation unit 107, an information presentation unit 108 and a half mirror 109. The constituent elements in common with the video image information processing apparatus 100 are substantially the same as those of the first embodiment, and thus will not be described in detail.

The video image capturing unit 103 is arranged behind the half mirror 109, and images the real space in front of the half mirror through the half mirror. That is, the video image capturing unit 103 images a person standing in front of the half mirror. The captured video image is sent to the person video image measurement unit 306.

The human body measurement unit 301 is arranged near the half mirror 109, and measures the human body based on data other than the video image captured by the video image capturing unit 103. The body measurement herein referred to means measurement of the three-dimensional shape, surface temperature, skin constituent, blood flow condition inside the body, muscle condition, and the like of the human body.

The three-dimensional shape of the human body can be measured using, for example, an infrared ranging camera, a stereo ranging camera or the like. Specifically, the distance distribution from the camera of the imaging range including the human body is measured, and the three-dimensional shape of the human body in the imaging range is measured by extracting the human body region in the imaging range using the background subtraction or the motion detection function. Fine protrusions and recesses such as wrinkles may be measured using a camera capable of high-resolution distance measurement.

The surface temperature of the human body is measured by including an infrared radiation thermometer or the like in the human body measurement unit 301. Also, in measurement of the skin constituent of the human body, for example, Melanin distribution in the skin is measured using an ultraviolet imaging camera, or the reflectance-wavelength characteristics of the skin is measured using a spectral reflectance meter. With respect to the blood flow condition inside the body, the transit rate of blood or the distribution of temporal blood transit volume are measured using a terahertz wave, for example. Similarly, with respect to the muscle condition, a terahertz wave or the like is used to measure the state of contraction and relaxation of muscles. In any case, human body measurement in the present embodiment is performed by using a known technique, and no further description thereof will be given. The results of the measurement performed by the human body measurement unit 301 are sent to the human video image measurement unit 306.

The human video image measurement unit 306 measures the physiological quantity of state of a person in the video image received from the video image capturing unit 103, based on the body measurement results received from the human body measurement unit 301. More specifically, the human video image measurement unit 306 measures the physiological condition of the human body parts, such as the head, shoulders, elbows, hands, waist, knees, and feet, of the person in the video image. The measurement results are sent to the information generation unit 107.

When the measurement is performed, first, the human video image measurement unit 306 measures the positions, in the video image received from the video image capturing unit 103, of the human body parts such as the head, shoulders, elbows, hands, waist, knees, and feet of the person in the video image. Next, calibration is performed in which the coordinate system expressing the position of a human body part in the video image is matched to the coordinate system of the human body measurement unit 301. Then, based on the result of the calibration, the name of the human body part whose position in the video image has been measured, or the term obtained therefrom by analogy is assigned to the body measurement result in the corresponding position as a label.

As a result of the measurement result and the label indicating the corresponding human body part being integrated, the result of the three-dimensional measurement of the human body performed by the measurement unit 301 is assigned with a label indicating the corresponding human body part shape. For example, the label "height" is assigned to the measurement result of the total length of the body. The label "abdominal circumference" is assigned to the result of the three-dimensional measurement of the abdomen. It is also possible to assign the label "wrinkle in the face" to protrusions and recesses in the facial skin. Similarly, the label "body temperature of (part of the body)" can be assigned with respect to the surface temperature of the human body.

For example, the label "general body temperature (measured at the forehead)" is assigned to the result of the surface temperature measurement in the face portion. To the result of the surface temperature measurement of hands, the label "body temperature indicating coldness of hand" may be assigned. Furthermore, to the skin constituent of the human body, the label "skin condition of (part of the body)" may be assigned. Also, the label "aging degree of skin" is assigned to the Melanin distribution in the face portion that is constantly exposed to the outside, and the label "state of chap of hand" is assigned to the reflectance-wavelength characteristics of the hand skin.

It is also possible to assign labels such as "presence of rush", "state of skin damage", "sign of medical illness", according to the measured skin condition. With respect to the blood flow condition inside the body, labels such as "condition of cerebral blood vessel" or "blood flow condition around the heart" can be assigned. Also with respect to the muscle condition, similarly, labels such as "condition of shoulder muscles" or "condition of foot muscles" can be assigned.

The human video image measurement unit 306 sends, to the information generation unit 107, the human body measurement result assigned with a label described above as the person video image measurement results, together with the video image received from the video image capturing unit 103. The information generation unit 107, upon receiving a human image measurement result from the human image measurement unit 306, generates information relating to the human body presented to the user based on the result.

For example, when a three-dimensional shape measurement value of the human body assigned with the label "abdominal circumference" has been received from the human video image measurement unit 306, the information generation unit 107 generates evaluation information used for metabolic syndrome medical checkup, such as "on the plump side", "on the slim side" or "standard weight", according to the value. Alternatively, a change in the body shape obtained by a comparison with the past measurement results, such as "you lost weight" or "you gained weight" may be generated as information.

When a surface temperature of the human body assigned with the label "general body temperature" has been received from the human video image measurement unit 306, the information generation unit 107 may generate, as information, the possibility of having been affected by new influenza according to the body temperature value. For example, if the body temperature is 37° C. or higher, information indicating, for example, "there is a possibility of having been affected by new influenza" is generated. If the surface temperature of the human body assigned with the label "body temperature indicating coldness of hand" has been received from the human video image measurement unit 306, the information generation unit 107 can generate information indicating "degree of coldness of the body".

Also, the information generation unit 107 can generate information indicating, for example, "skin age" from the skin condition assigned with the label "aging degree of skin", and information indicating, for example, "prediction of skin damage" from the skin condition assigned with the label "state of chap of hand". From the skin condition assigned with the label "presence of rush", information of "possibility of having been affected by a disease" can be generated as information.

The information generation unit 107 can generate, as information, the risk of disease also from the blood flow conditions assigned with labels such as "condition of cerebral blood vessel" or "blood flow condition around the heart". For example, information indicating "there is a possibility of brain disease or myocardial infarction" can be generated based on the state of a decrease in the blood flow rate or the blood volume assigned with the label "head (brain)" or "in the vicinity of heart".

Furthermore, if motion (repetition of strain and relaxation) of muscles assigned with a label such as "limbs" is inactive, it is possible for the information generation unit 107 to generate information indicating "there is a possibility of cerebral infarction" based thereon. It is also possible for the information generation unit 107 to generate information indicating, for example, "shoulder stiffness", based on a state of continuous muscle strain assigned with the label "shoulder muscles".

The information generation unit 107 holds inside thereof a list of combinations between "person video image measurement results assigned with labels" and "information" as described above. Then, upon receiving a measurement result assigned with a label from the human video image measurement unit 306, the information generation unit 107 extracts information associated with that measurement result assigned with a label, thereby generating the information as described above. The generated information is expressed as a video image by computer graphics (CG) or the like. The information is expressed such that people can realize the generated information more easily.

For example, the generated information is expressed such that the information is presented in the vicinity of the human body part corresponding to the human body information that is the source of the information. Alternatively, the information may be expressed by indicating a comparison video image with which the meaning of the presented information is realized (if information "you gained weight" is to be indicated, a video image captured in the past for which information "standard weight" was obtained). With respect to the video image expressing the generated information, only the video image may be sent to the information presentation unit 108, or the video image may be superposed on the video image captured by the video image capturing unit 103 and then sent to the information presentation unit 108.

The information presentation unit 108 is formed as a single body with the half mirror 109, and displays the video image received from the information generation unit 107 superposed on the mirror image in the half mirror 109. This is realized by, for example, attaching a liquid crystal display to the back of the half mirror, or attaching a transparent diffusion sheet on the half mirror and projecting a video image by a projector. The video image received from the information generation unit 107 may be a video image in which only information generated by the information generation unit 107 is expressed, or may be a video image in which that video image is superposed on a video image captured by the video image capturing unit 103.

Figure 10:
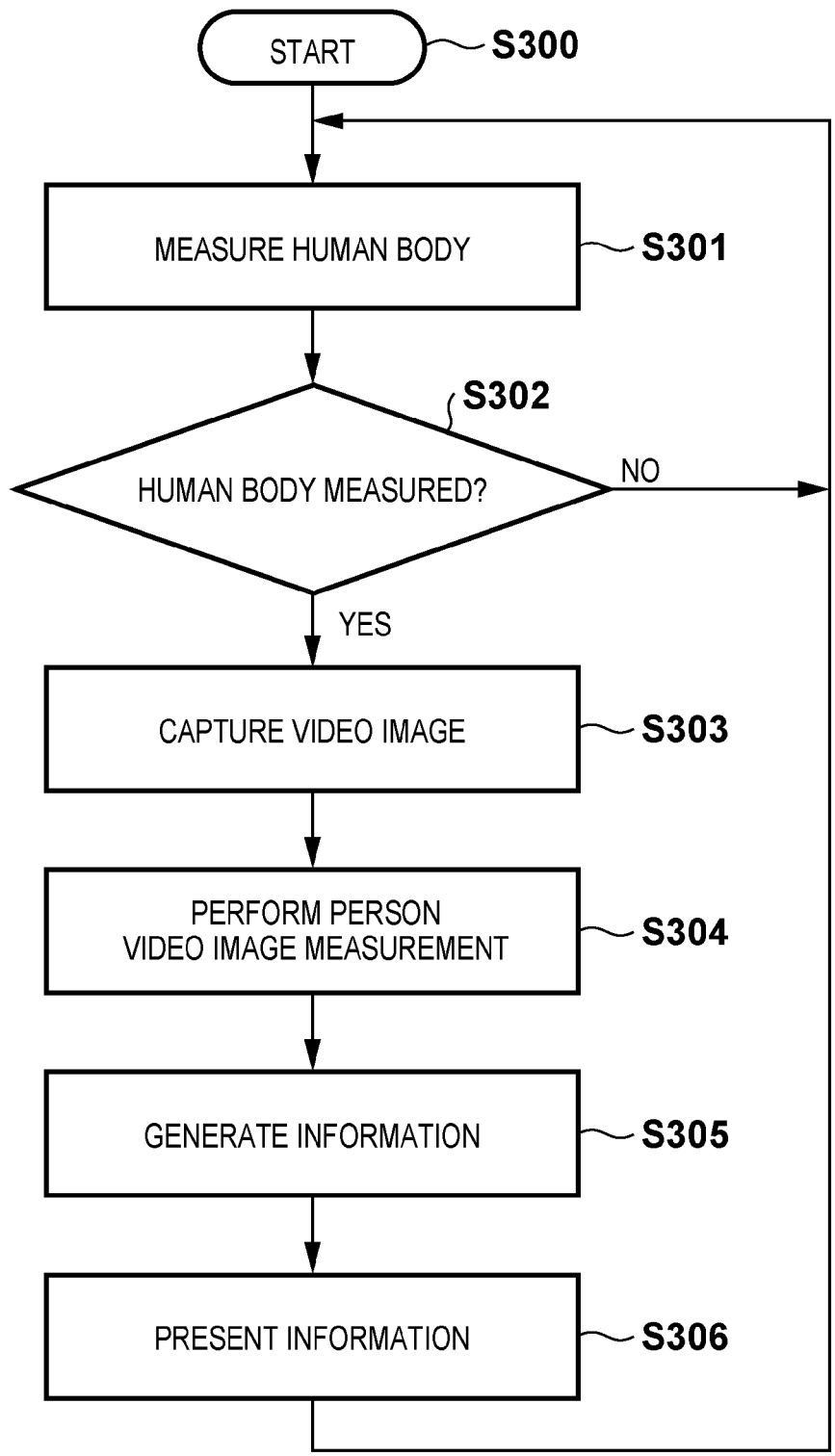
FIG. 10 illustrates processing performed by the video image information processing apparatus.

FIG. 10 illustrates a flow of processing performed by the information processing apparatus 300 of the present embodiment. Note that the program code according to this flowchart is stored in a memory such as a RAM or a ROM, not shown in the drawings, in the apparatus of the present embodiment, and the processing flow is read out by a CPU or the like, not shown in the drawings, and executed. Note that processing for sending and receiving data and the like may be performed directly or via a network, of course. Thus, such processing will not be particularly mentioned in the following description.

When processing is started in step S300, first, the human body measurement unit 301 performs measurement of the human body. In step S302, whether the human body has been measured in step S301 is determined. If a measurement value relating to the human body has been obtained, it is determined that the human body has been measured, and the processing proceeds to step S303. If the measurement value relating to the human body has not been obtained, the processing returns to step S301.

In step S303, the video image capturing unit 103 captures a video image. The captured video image is sent to the human video image measurement unit 306. In step S304, the human video image measurement unit 306 first measures the positions, in the video image received from the video image capturing unit 103, of the human body parts such as the head, shoulders, elbows, hands, waist, knees and feet of a person in the video image. Next, calibration is performed in which the coordinate system expressing the position of a human body part in the video image is matched to the coordinate system of the human body measurement unit 301.

Then, based on the result of the calibration, the name of the human body part whose position in the video image has been measured, or the term obtained by analogy is assigned to the person video image measurement result in the corresponding position as a label. The body measurement result assigned with the label is sent as a person video image measurement result to the information generation unit 107, and the processing proceeds to step S305.

In step S305, the information generation unit 107 generates evaluation information based on the person video image measurement result, which is a person measurement result assigned with a label. The generated information is expressed as a video image, and only the video image, or a video image in which that video image is superposed on the video image sent from the video image capturing unit 103 is sent to the information presentation unit 108. In step S306, the information presentation unit 108 displays the video image sent from the information generation unit 107, and the processing returns to step S301.

According to the processing described above, the video image information processing apparatus 300 can present to the user standing in front of the mirror a mirror image of himself or herself, and information visualized by the information presentation unit at the same time. By this presentation, for example, the user can know whether he or she has recently gained or lost weight, or has been affected by a disease such as influenza, or his or her health condition appearing in the skin.

With the configuration of the present invention, a video image information processing apparatus and a method for interpreting an evaluation index derived from measurement of the posture or the like of the human body, and visualizing information for appropriately improving the human body can be provided.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-230101, filed Oct. 12, 2010, which is hereby incorporated by reference herein in its entirety.

What is claimed is:

1. A video image information processing apparatus comprising:
    a half mirror;
    an imaging unit configured to be arranged behind the half mirror and image a person present in front of the half mirror;
    an extraction unit configured to extract one or more parts of the person from a video image captured by the imaging unit;
    an obtaining unit configured to obtain a center-of-gravity line of the person;
    a calculation unit configured to calculate, for each of the extracted parts a distance between the extracted part and the obtained center-of-gravity line; and
    a display unit configured to display, for each of the extracted parts, a graphic that indicates a correction direction and a correction distance in a position corresponding to the extracted part in a mirror image in the half mirror, wherein the display unit displays the calculated distance of the extracted part corresponding to a particular part of a person in an exaggerated manner in a case where the calculated distance regarding the particular part is larger than a threshold value.

2. The apparatus according claim 1, wherein the one or more extracted parts include at least one of the head, shoulders, elbows, hands, waist, and knees of the human body.

3. The apparatus according claim 1, further comprising:
    a storage unit configured to store the video image captured by the imaging unit, the center-of-gravity line obtained by the obtaining unit, and the calculated distance; and
    an acceptance unit configured to accept editing performed by a user on the center-of-gravity line or position of predetermined part by referencing information stored in the storage unit,
    wherein the display unit displays, in the half mirror, information related to the calculated distance obtained by performing the editing accepted by the acceptance unit.

4. The apparatus according claim 3, wherein the display unit further displays, in the half mirror, a comparison video image of the person stored in the storage unit such that the person is shown in actual size.

5. The apparatus according claim 1, wherein the obtaining unit obtains at least one of a three-dimensional shape, a surface temperature, a skin constituent, a blood flow condition inside the body and a muscle condition of the person, and the evaluation unit uses a measurement result corresponding to each of parts of the subject acquired by the measurement performed by the measurement unit as the evaluation information.

6. The apparatus according claim 5, wherein the display unit displays, in the half mirror, a label indicating the name of each of the parts.

7. A method for controlling a video image information processing apparatus that comprises a half mirror, an imaging unit configured to be arranged behind the half mirror and image a person present in front of the half mirror, and a display unit configured to display a video image in the half mirror, the method comprising the steps of:
    extracting one or more parts of a person from a video image captured by the imaging unit;
    obtaining a center-of-gravity line of the person;
    calculating, for each of the extracted parts, a distance between the extracted predetermined part and the obtained center-of-gravity line; and
    controlling the display unit to display, for each of the extracted parts, a graphic that indicates a correction direction and a correction distance in a position corresponding to the extracted part in a mirror image in the half mirror, wherein the display unit is controlled to display the calculated distance of the extracted part corresponding to a particular part of a person in an exaggerated manner in a case where the calculated distance regarding the particular part is larger than a threshold value.

8. A non-transitory computer readable medium storing a program for causing a computer to execute the steps in the method according to claim 7.

* * * * *